United States Patent
Atwood

(10) Patent No.: US 9,656,424 B2
(45) Date of Patent: May 23, 2017

(54) SYSTEM FOR ADJUSTING PLATFORM HEIGHT DURING THREE-DIMENSIONAL PRINTING OF AN OBJECT

(71) Applicant: Xerox Corporation, Norwalk, CT (US)

(72) Inventor: Christopher D. Atwood, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 386 days.

(21) Appl. No.: 14/499,529

(22) Filed: Sep. 29, 2014

(65) Prior Publication Data
US 2016/0089838 A1     Mar. 31, 2016

(51) Int. Cl.
*B29C 67/00*     (2006.01)
*B33Y 30/00*     (2015.01)

(52) U.S. Cl.
CPC ...... *B29C 67/0085* (2013.01); *B29C 67/0059* (2013.01); *B33Y 30/00* (2014.12)

(58) Field of Classification Search
CPC ................................................ B29C 67/0085
See application file for complete search history.

(56) References Cited

U.S. PATENT DOCUMENTS

| 7,942,987 B2* | 5/2011 | Crump | B22F 3/1055 148/516 |
| 2012/0046779 A1* | 2/2012 | Pax | B29C 67/0055 700/112 |
| 2014/0301884 A1* | 10/2014 | Hellestam | B22F 3/1055 419/2 |
| 2015/0217519 A1* | 8/2015 | Otten | B29C 67/0085 264/40.1 |

OTHER PUBLICATIONS

"Geneva Drive", wikipedia.com, Sep. 16, 2010—accessed on Dec. 15, 2016 at https://en.wikipedia.org/w/index.php?title=Geneva_drive&oldid=385157414.*
"Differential screw", wikipedia.com, May 25, 2009—accessed on Dec. 15, 2016 at https://en.wikipedia.org/w/index.php?title=Differential_screw&oldid=292122581.*

* cited by examiner

*Primary Examiner* — Alison L Hindenlang
(74) *Attorney, Agent, or Firm* — Maginot Moore & Beck LLP

(57) ABSTRACT

A three-dimensional object printer uses a mechanical system to adjust a vertical height of a platform that supports a substrate for formation of a three-dimensional object in the printer. The mechanical system includes a Geneva mechanism operated by a rack and pinion arrangement to drive differential screws and adjust a vertical distance between the platform and a printhead in the printer.

20 Claims, 3 Drawing Sheets

SYSTEM FOR ADJUSTING PLATFORM HEIGHT DURING THREE-DIMENSIONAL PRINTING OF AN OBJECT

TECHNICAL FIELD

The device disclosed in this document relates to systems that produce three-dimensional objects by selectively adding material and, more particularly, to the accurate production of objects with such methods.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material onto a substrate in different shapes. A platform supports the substrate at a position that is opposite the one or more printheads. Typically, the one or more printheads can move in an X-Y plane opposite the substrate and platform to enable the printheads to eject material onto different locations on the substrate. Either the platform or the one or more printheads are configured to move in the vertical or Z direction to maintain a predetermined distance between the upper layer of the object being printed and the one or more printheads. Maintaining this distance is important as it affects the accuracy with which the one or more printheads eject the material forming the object. If the distance is too large, the material drops can divert from their intended paths. If the distance is too small, the drops may be able to clog nozzles in the one or more printheads. In previously known systems for printing three-dimensional objects, the Z direction movement is obtained with stepper motors or pneumatically powered mechanisms. The motors require electrical power and motor hysteresis can affect the accuracy of the platform movement. Additionally, after a height adjustment has been made, the platform must remain at the new height. Sometimes electrical motors exhibit backlash and the height of the platform may retract slightly. An object printing system capable of accurately adjusting the vertical distance between one or more printheads and the platform supporting the substrate on which the object is formed would be beneficial.

SUMMARY

A three-dimensional object printer that mechanically adjusts the vertical distance between the one or more printheads and the platform supporting the substrate on which the object is printed includes a first planar member having first and second ends, a second planar member having first and second ends, the second planar member being positioned parallel to the first planar member with the first ends of the first and second planar members being opposite one another and the second ends of the first and second planar members being opposite one another, a conveyor on which the second planar members rests, the conveyor being configured to move the first and second planar members along a path through the printer, at least two screws, a first screw being mounted between the first ends of the first and second planar members and a second screw being mounted between the second ends of the first and second planar members, the at least two screws being configured to enable rotation of the first screw to move vertically the first ends of the first and second planar members with reference to each other and to enable rotation of the second screw to move vertically the second ends of the first and second planar members with reference to each other, a rotating member mounted to the second planar member and being operatively connected to the at least two screws to turn the screws, a drive wheel mounted to the second planar member and being operatively connected to the rotating member, the drive wheel being configured to rotate the rotating member a predetermined distance to turn the screws, a first plurality of elongated members extending from the drive wheel to enable at least one elongated member in the first plurality of elongated member to extend past an edge of the first and second planar members, and a second plurality of elongated members extending in a vertical direction to enable the at least one elongated member in the first plurality of elongated members to engage one elongated member in the second plurality of elongated members at a right angle to one another to enable the drive wheel to be turned and rotate the rotating member the predetermined distance as the conveyor carries the second planar member past the second plurality of elongated members.

A moving platform incorporated in a three-dimensional object printing system that mechanically adjusts the vertical distance between the one or more printheads and the platform supporting the substrate on which the object is printed includes a first planar member having first and second ends, a second planar member having first and second ends, the second planar member being positioned parallel to the first planar member with the first ends of the first and second planar members being opposite one another and the second ends of the first and second planar members being opposite one another, at least two screws, a first screw being mounted between the first ends of the first and second planar members and a second screw being mounted between the second ends of the second ends of the first and second planar members, the at least two screws being configured to enable rotation of the first screw to move vertically the first ends of the first and second planar members with reference to each other and to enable rotation of the second screw to move vertically the second ends of the first and second planar members with reference to each other, a rotating member mounted to the second planar member and being operatively connected to the at least two screws to turn the screws, a drive wheel mounted to the second planar member and being operatively connected to the rotating member, the drive wheel being configured to rotate the rotating member a predetermined distance to turn the screws, and an elongated member extending from the drive wheel to enable the drive wheel to be turned and rotate the rotating member the predetermined distance.

BRIEF DESCRIPTION OF THE DRAWINGS

The foregoing aspects and other features of a three-dimensional object printing system that mechanically adjusts the vertical distance between the one or more printheads and the platform supporting the substrate on which the object is formed are explained in the following description, taken in connection with the accompanying drawings.

DETAILED DESCRIPTION

Figure 1:
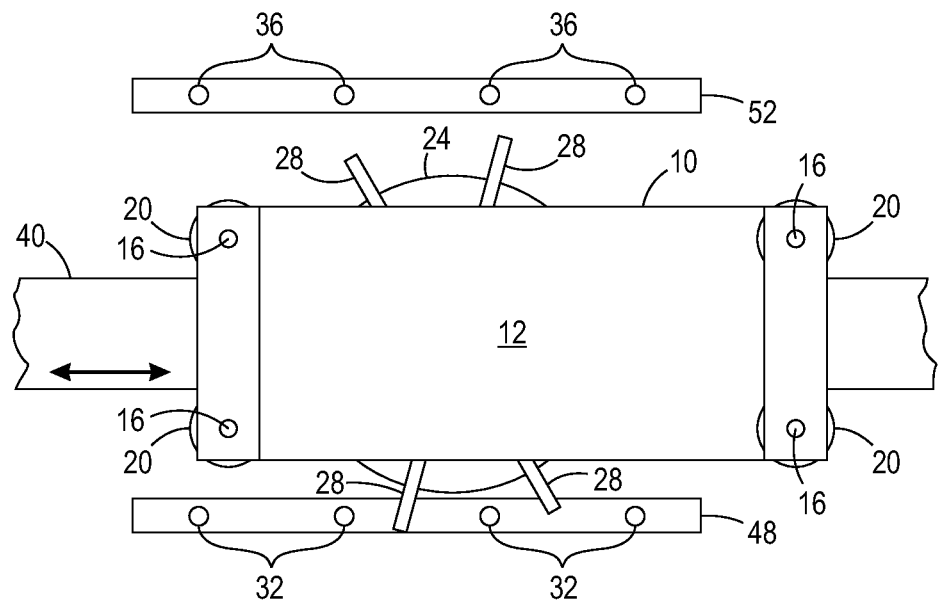
FIG. 1 is top view of a platform configured to maintain a vertical distance with reference to one or more printheads using a mechanical adjustment system.

For a general understanding of the environment for the device disclosed herein as well as the details for the device, reference is made to the drawings. In the drawings, like reference numerals designate like elements.

FIG. 1 shows a top surface of a platform that supports a substrate for three-dimensional object formation in a printer and portions of a vertical height adjustment system underneath the platform. In the figure, platform 10 has an upper surface 12. Extending through openings in the platform 10 are four screws 16 so that only a top end of each screw is visible in the view of FIG. 1. Mounted about each screw 16 is a pulley 20 so the pulley rotates with the screw. While the embodiment of FIG. 1 depicts four screws positioned at the four corners of the platform 10, two screws with a pulley mounted about each one are positioned approximately equidistant between the two corners at each end of platform 10 in another embodiment. A drive wheel 24 has a diameter that enables a portion of the drive wheel to extend past the longitudinal edges of the platform 10. A first plurality of elongated members 28 extend from the circumference of the drive wheel 24 so they extend past the longitudinal edges of the platform 10. A second plurality of elongated members 32 and a third plurality of elongated members 36 extend vertically from supports 48 and 52, respectively, which are positioned on opposite sides of the platform 10. These elongated members are configured to move with reference to the platform 10 so only one plurality of elongated members can engage one of the elongated members 28 extending from drive wheel 24 at a time. In FIG. 1, the second plurality of elongated members 32 is able to contact one of the elongated members 28 at a right angle to the member. A conveyor 40 carries another planar member 44 (FIG. 2) to move the platform 10 bi-directionally as shown in FIG. 1.

Figure 2:
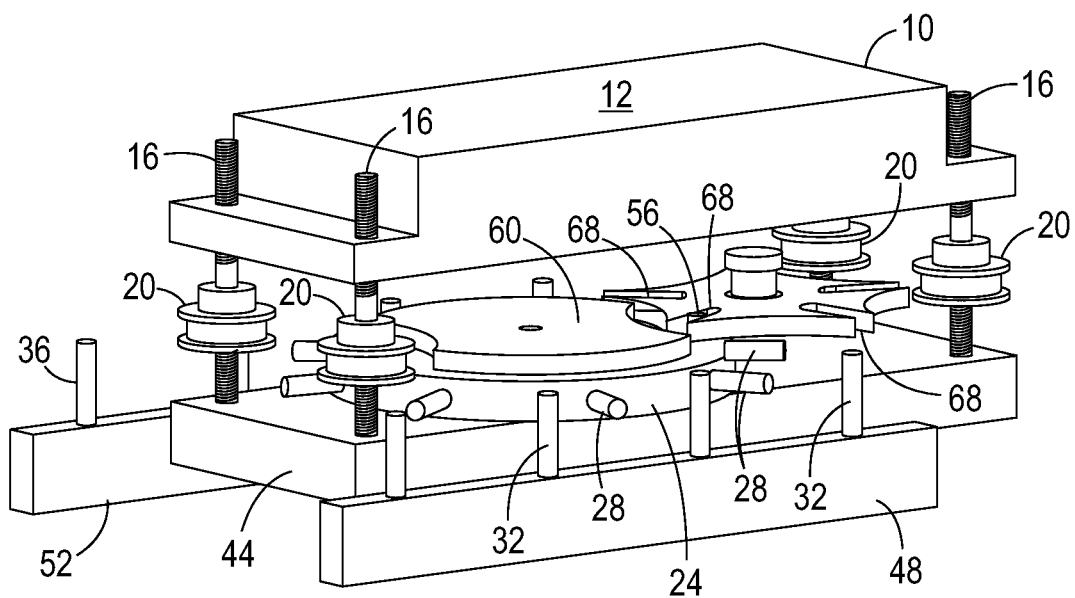
FIG. 2 is a side perspective view of the platform shown in FIG. 1 revealing the mechanical adjustment system.
Figure 3:
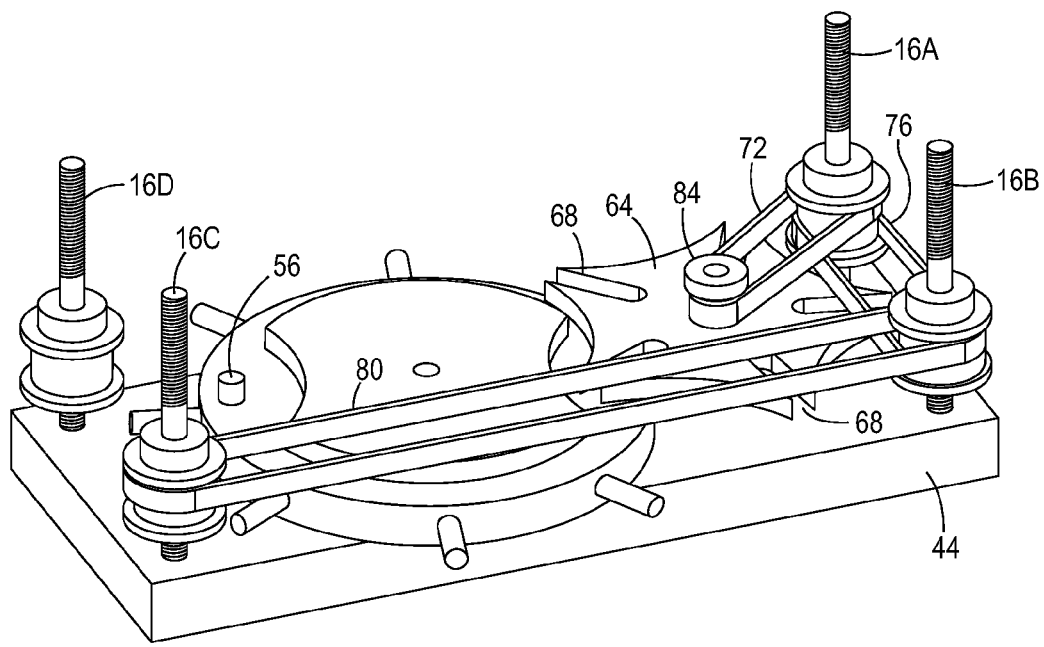
FIG. 3 is a perspective view of the mechanical adjustment system without the platform.

FIG. 2 is a side perspective view of the platform shown in FIG. 1. In this view, a planar member 44 is visible. The screws 16 are mounted between the platform 10 and the planar member 44 to vary the vertical distance between the platform 10 and member 44 as the screws 16 turn. Drive wheel 24 includes a pair of pins 56 positioned diametrically opposite one another (FIG. 3). Each pin 56 extends upwardly from the upper surface of wheel 24. Drive wheel 24 also has a blocking disc 60. A rotating member 64 is formed with slots 68. The rotating member 64 is positioned with respect to the pin 56 so one of the slots 68 receives the pin 56 and the member 64 rotates as the drive wheel 24 rotates until the pin 56 exits the slot in which it was received. The blocking disc 60 holds the rotating member 64 at that position until the pin 56 returns to be received by the next slot 68 in member 64. Thus, the structure of drive wheel 24 and rotating member 64 form a Geneva mechanism, which enables continuous circular motion to be translated into intermittent rotary motion. While the drive wheel 24 includes a pair of pins 56, another embodiment has only a single pin to rotate the member 64 only once per revolution of the drive wheel 24. The Geneva wheel provides a locking feature that keeps the screws from turning away from the desired position to prevent the platform from moving unexpectedly during use.

FIG. 3 demonstrates how the intermittent motion of the rotating member 64 is transferred to the screws 16. In the embodiment shown in the figure, endless belts 72, 76 and 80 are provided. Endless belt 72 operatively connects a pulley 84 mounted about a shaft at the center of member 64 to a pulley mounted about the screw 16a. The endless belt 76 operatively connects that screw 16a to the screw 16b, which is at the same end of the planar member 44, but at the other corner of that end. In an alternative embodiment, an endless belt can be used to operatively connect screw 16a to screw 16d to rotate that screw. Endless belt 80 operatively connects screw 16b to screw 16c so screw 16c is turned by the rotation of member 64. Other arrangements of the belts can be configured to transfer the rotation to the screws 16 and adjust the vertical distance between platform 10 and planar member 44. This adjustment also alters the vertical distance between the top surface 12 and a printhead positioned over the top surface 12.

In the embodiment shown in FIG. 1 to FIG. 4, the screws are differential screws. Differential screws are known and are used to make small, precise adjustments between two objects connected by the screws. Each of the differential screws depicted in FIG. 1 to FIG. 4 is comprised of a spindle having one screw pitch and the hole in the platform 10 through which the spindle passes is threaded with another screw pitch. As the spindle rotates, the length of the spindle between the platform 10 and the member 44 changes based on the difference between the thread pitches. These mechanisms allow extremely small adjustments using commonly available screws. For example, in one embodiment, the height of the platform can be adjusted in 5 micron increments. The differential screws in this embodiment can be implemented with a spindle having M8×0.75 thread pitch and M5×0.8 thread pitch. The effective pitch for this differential thread is 0.05 mm or 50 microns per turn of the screw. Using pulleys that provide a 2:1 reduction with a Geneva wheel mechanism that provides a 5:1 reduction, the 50 micron adjustment per screw turn is reduced by 10 to 5 microns. Consequently, the height of the platform can be positioned with 2.5 microns of its intended positioned. The vertical adjustment amount can be configured with reference to reduction ratios obtained with different Geneva wheel configurations, different pulleys or differential screws.

Figure 4:
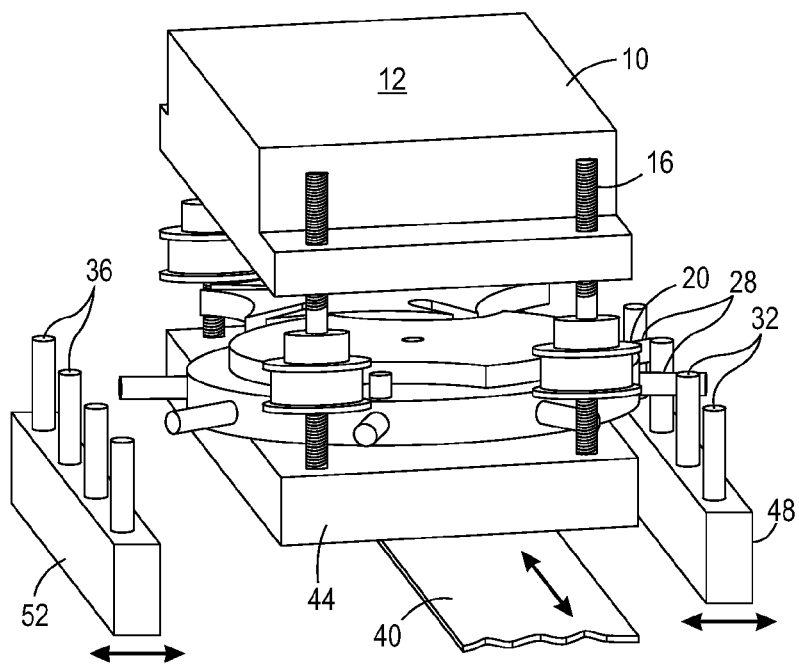
FIG. 4 is a perspective view of platform and mechanical adjustment system depicting one rack and pinion drive mechanism engaging one side of the mechanical adjustment system and another rack and pinion drive mechanism being disengaged.

FIG. 4 shows the supports 48 and 52 being configured for bi-directional movement that is perpendicular to the bi-directional movement of the conveyor 40. Support 48 has been moved towards the conveyor 40 to a position that enables at least one of the elongated members 28 to engage one of the elongated members 32, while the support 52 has been moved to prevent engagement of any elongated member 28 with any of the elongated members 36. The movement of the supports 48 and 52 can be achieved with a single motive force applied to a mechanism that connects the two supports to one another or the supports 48 and 52 can be configured for independent movement. The bi-directional movement of conveyor 40, regardless of which plurality of elongated members are positioned to enable the conveyor movement to rotate wheel 24, provides bi-directional adjustment of the platform height in the vertical direction.

Figure 5:
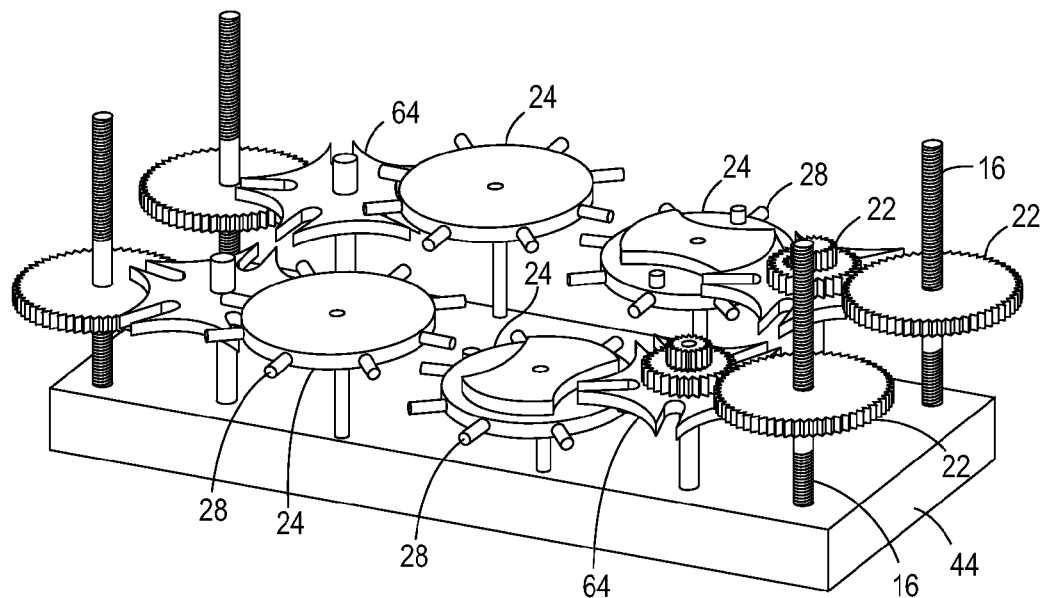
FIG. 5 depicts an embodiment of the mechanical adjustment system that enables four corners of the platform to be adjusted in vertical height uniformly or independently.
Figure 6:
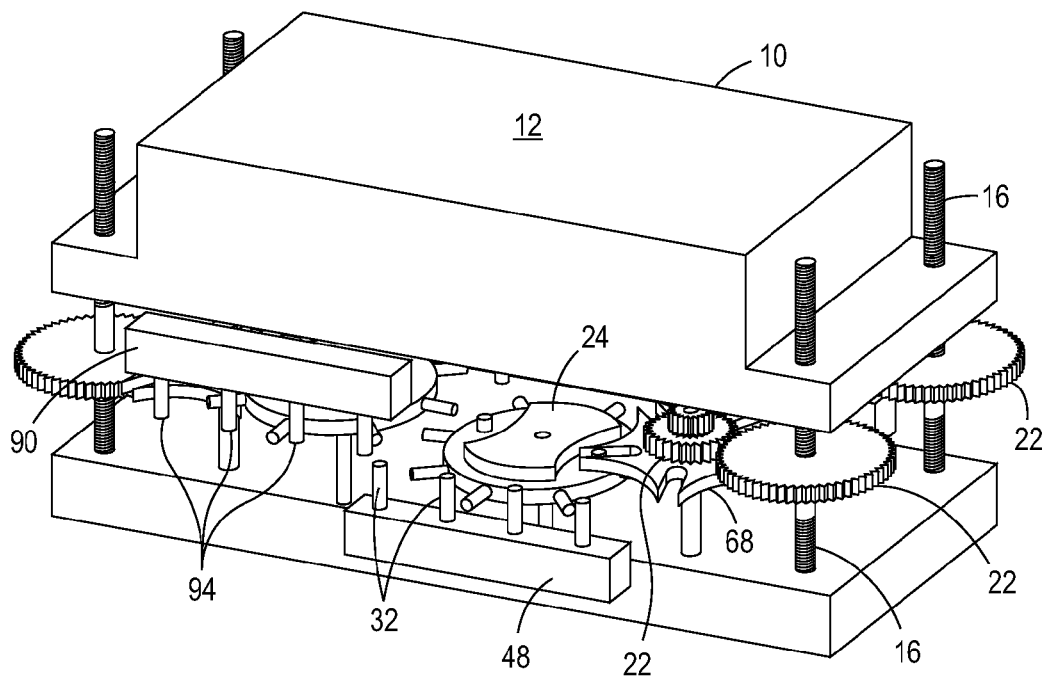
FIG. 6 shows the embodiment of FIG. 5 with two rack and pinion drive mechanisms engaging the mechanical adjustment system to displace two corners of the platform.

Another embodiment of a platform that enables mechanical adjustment of a platform surface in a three-dimensional object printer is shown in FIG. 5 and FIG. 6. In this embodiment, an adjustment mechanism is provided at each corner of the planar member 44. Again, the adjustment mechanism includes a Geneva wheel having a drive wheel 24 and a rotating member 64. The pulleys 20 have been replaced with toothed gears 22. The toothed gear 22 on the shaft about which the rotating member 64 rotates drives the toothed gear mounted about one of the screws 16 to rotate that screw. The two Geneva wheel mechanisms shown in the left side of FIG. 5 and FIG. 6 are inverted to offset the elongated members 28 extending from the drive wheels of those mechanisms vertically from the elongated members extending from the drive wheels of the two adjustment mechanisms shown on the right side of the figure. This vertical offset enables the two mechanisms on each longitudinal side of the planar member 44 to be positioned closer to one another without enabling the elongated members extending from the two drive wheels from interfering the rotation of each drive wheel. Additionally, as shown in FIG. 6, this vertical offset enables a support 90 with a plurality of elongated members 94 to be offset vertically from support 48 and elongated members 32 so the drive wheels in the two Geneva mechanisms can be independently driven. Because each screw is driven independently, both the pitch and roll of the platform 10 can be adjusted to correct for manufacturing variations of the device, variations during operation of the device, variations during operation of the printer, or variations in part thickness uniformity as the part is being printed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A platform for supporting a substrate on which a three-dimensional object is formed by at least one printhead comprising:
   a first planar member having first and second ends;
   a second planar member having first and second ends, the second planar member being positioned parallel to the first planar member with the first ends of the first and second planar members being opposite one another and the second ends of the first and second planar members being opposite one another;
   at least two screws, a first screw being mounted between the first ends of the first and second planar members and a second screw being mounted between the second ends of the second ends of the first and second planar members, the at least two screws being configured to enable rotation of the first screw to move vertically the first ends of the first and second planar members with reference to each other and to enable rotation of the second screw to move vertically the second ends of the first and second planar members with reference to each other;
   a rotating member mounted to the second planar member and being operatively connected to the at least two screws to turn the screws; a drive wheel mounted to the second planar member and being operatively connected to the rotating member, the drive wheel being configured to rotate the rotating member a predetermined distance to turn the screws; and an elongated member extending from the drive wheel in a plane parallel to a surface of the second planar member to enable the drive wheel to turn in the plane parallel to the surface of the second planar member and rotate the rotating member the predetermined distance to turn the at least two screws as the second planar member moves along a path parallel to the second planar member.

2. The platform of claim 1 wherein the first screw and the second screw are differential screws.

3. The platform of claim 1, the at least two screws further comprising:
   a third screw being mounted between the first ends of the first and second planar members;
   a fourth screw being mounted between the second ends of the second ends of the first and second planar members, the third and fourth screws being configured to enable rotation of the third screw to move vertically the first ends of the first and second planar members with reference to each other and to enable rotation of the fourth screw to move vertically the second ends of the first and second planar members with reference to each other, the first and third screws being positioned at opposite corners of the first ends of the first and second planar members and the second and fourth screws being positioned at opposite corners of the second ends of the first and second planar members;
   the rotating member being operatively connected to the first, second, third and fourth screws to turn the screws; and
   the drive wheel operatively connected to the rotating member, the drive wheel being configured to rotate the rotating member a predetermined distance to synchronize turning of the first, second, third and fourth screws.

4. The platform of claim 1 further comprising:
   a shaft about which the rotating member rotates;
   a first toothed gear mounted about the shaft;
   a second toothed gear mounted about the first screw, the first toothed gear and the second toothed gear being intermeshed with one another to enable rotation of the rotating member and the shaft to rotate the first toothed gear and the second toothed gear; and
   an endless belt operatively connecting the first screw to the second screw to enable rotation of the first screw to turn the second screw.

5. The platform of claim 1 further comprising:
   a shaft about which the rotating member rotates;
   a first endless belt operatively connecting the shaft and the first screw to enable rotation of the shaft to rotate the first screw; and
   a second endless belt operatively connecting the first screw to the second screw to enable rotation of the first screw to turn the second screw.

6. The platform of claim 1 wherein the rotating member and the drive wheel are configured as a Geneva mechanism.

7. The platform of claim 6 wherein the first screw and the second screw are differential screws.

8. A three-dimensional object printer comprising:
   a first planar member having first and second ends;
   a second planar member having first and second ends, the second planar member being positioned parallel to the first planar member with the first ends of the first and second planar members being opposite one another and the second ends of the first and second planar members being opposite one another;
   a conveyor on which the second planar members rests, the conveyor being configured to move the first and second planar members along a path through the printer;
   at least two screws, a first screw being mounted between the first ends of the first and second planar members and a second screw being mounted between the second ends of the second ends of the first and second planar members, the at least two screws being configured to enable rotation of the first screw to move vertically the first ends of the first and second planar members with reference to each other and to enable rotation of the second screw to move vertically the second ends of the first and second planar members with reference to each other;

a rotating member mounted to the second planar member and being operatively connected to the at least two screws to turn the screws;

a drive wheel mounted to the second planar member and being operatively connected to the rotating member, the drive wheel being configured to rotate the rotating member a predetermined distance to turn the screws;

a first plurality of elongated members extending from the drive wheel to enable at least one elongated member in the first plurality of elongated member to extend past an edge of the first and second planar members; and a second plurality of elongated members extending in a vertical direction to enable the at least one elongated member in the first plurality of elongated members to engage one elongated member in the second plurality of elongated members at a right angle to one another to enable the drive wheel to be turned and rotate the rotating member the predetermined distance as the conveyor carries the second planar member past the second plurality of elongated members.

9. The printer of claim 8 wherein the first screw and the second screw are differential screws.

10. The printer of claim 8, the at least two screws further comprising:
a third screw being mounted between the first ends of the first and second planar members;
a fourth screw being mounted between the second ends of the second ends of the first and second planar members, the third and fourth screws being configured to enable rotation of the third screw to move vertically the first ends of the first and second planar members with reference to each other and to enable rotation of the fourth screw to move vertically the second ends of the first and second planar members with reference to each other, the first and third screws being positioned at opposite corners of the first ends of the first and second planar members and the second and fourth screws being positioned at opposite corners of the second ends of the first and second planar members;
the rotating member being operatively connected to the first, second, third and fourth screws to turn the screws; and
the drive wheel operatively connected to the rotating member, the drive wheel being configured to rotate the rotating member a predetermined distance to synchronize turning of the first, second, third and fourth screws.

11. The printer of claim 8 further comprising:
a shaft about which the rotating member rotates;
a first toothed gear mounted about the shaft;
a second toothed gear mounted about the first screw, the first toothed gear and the second toothed gear being intermeshed with one another to enable rotation of the shaft to rotate the first toothed gear and the second toothed gear; and
an endless belt operatively connecting the first screw to the second screw to enable rotation of the first screw to turn the second screw.

12. The printer of claim 8 further comprising:
a shaft about which the rotating member rotates;
a first endless belt operatively connecting the shaft and the first screw to enable rotation of the shaft to rotate the first screw; and
a second endless belt operatively connecting the first screw to the second screw to enable rotation of the first screw to turn the second screw.

13. The printer of claim 8 wherein the rotating member and the drive wheel are configured as a Geneva mechanism.

14. The printer of claim 13 wherein the first screw and the second screw are differential screws.

15. The printer of claim 8 further comprising:
a third plurality of elongated members positioned on a side of the second planar member that is opposite a side on which the second plurality of elongated members are positioned;
the first plurality of elongated members being configured to enable at least one elongated member to extend past the edge of the second planar member towards the second plurality of elongated members and to enable at least one other elongated member to extend past another edge of the second planar member towards the third plurality of elongated members; and
the second plurality of elongated members and the third plurality of members are configured to move with reference to the second planar member to position only one of the second plurality and third plurality of elongated members for engagement with the one elongated member in the first plurality of elongated members extending from the drive wheel.

16. The printer of claim 15, the conveyor being further comprised to move the second planar member bi-directionally along the path in the printer; and
the second plurality of elongated members and the third plurality of members are configured to move with reference to the second planar member to position only one of the second plurality and third plurality of elongated members for engagement with the one elongated member in the first plurality of elongated members extending from the drive wheel with reference to a direction in which the conveyor is moving the second planar member to adjust a vertical distance between the first planar member and the second planar member in two opposite directions.

17. A platform for supporting a substrate on which a three-dimensional object is formed by at least one printhead comprising:
a first planar member having first and second ends;
a second planar member having first and second ends, the second planar member being positioned parallel to the first planar member with the first ends of the first and second planar members being opposite one another and the second ends of the first and second planar members being opposite one another;
at least two differential screws, a first differential screw being mounted between the first ends of the first and second planar members and a second differential screw being mounted between the second ends of the second ends of the first and second planar members, the at least two differential screws being configured to enable rotation of the first differential screw to move vertically the first ends of the first and second planar members with reference to each other and to enable rotation of the second differential screw to move vertically the second ends of the first and second planar members with reference to each other;

a Geneva mechanism mounted to the second planar member, the Geneva mechanism having a rotating member operatively connected to the at least two differential screws to turn the differential screws and a drive wheel operatively connected to the rotating member to rotate the rotating member a predetermined distance to turn the differential screws; and an elongated member extending from the drive wheel of the Geneva mechanism in a plane parallel to a surface of the second planar member to enable the drive wheel to turn in the plane parallel to the surface of the second planar member and rotate the rotating member the predetermined distance to turn the at least two screws as the second planar member moves along a path parallel to the second planar member.

18. The platform of claim 17, the at least two differential screws further comprising:
a third differential screw being mounted between the first ends of the first and second planar members;
a fourth differential screw being mounted between the second ends of the second ends of the first and second planar members, the third and fourth differential screws being configured to enable rotation of the third differential screw to move vertically the first ends of the first and second planar members with reference to each other and to enable rotation of the fourth differential screw to move vertically the second ends of the first and second planar members with reference to each other, the first and third differential screws being positioned at opposite corners of the first ends of the first and second planar members and the second and fourth differential screws being positioned at opposite corners of the second ends of the first and second planar members;

the rotating member of the Geneva mechanism being operatively connected to the first, second, third and fourth differential screws to turn the differential screws; and the drive wheel of the Geneva mechanism being operatively connected to the rotating member to rotate the rotating member a predetermined distance to synchronize turning of the first, second, third and fourth differential screws.

19. The platform of claim 17 further comprising:
a shaft about which the rotating member of the Geneva mechanism rotates;
a first toothed gear mounted about the shaft;
a second toothed gear mounted about the first differential screw, the first toothed gear and the second toothed gear being intermeshed with one another to enable rotation of the rotating member and the shaft to rotate the first toothed gear and the second toothed gear; and
an endless belt operatively connecting the first differential screw to the second differential screw to enable rotation of the first differential screw to turn the second differential screw.

20. The platform of claim 17 further comprising:
a shaft about which the rotating member of the Geneva mechanism rotates;
a first endless belt operatively connecting the shaft and the first differential screw to enable rotation of the shaft to rotate the first differential screw; and
a second endless belt operatively connecting the first differential screw to the second differential screw to enable rotation of the first differential screw to turn the second differential screw.

* * * * *